(12) United States Patent
Jhou et al.

(10) Patent No.: US 10,202,158 B2
(45) Date of Patent: Feb. 12, 2019

(54) ADJUSTABLE SEAT TUBE STRUCTURE AND BICYCLE

(71) Applicant: GIANT MANUFACTURING CO., LTD., Taichung (TW)

(72) Inventors: Shu-Yu Jhou, Taipei (TW); Che-Wei Hsu, New Taipei (TW)

(73) Assignee: GIANT MANUFACTURING CO., LTD., Taichung (TW)

( * ) Notice: Subject to any disclaimer, the term of this patent is extended or adjusted under 35 U.S.C. 154(b) by 0 days.

(21) Appl. No.: 15/688,897

(22) Filed: Aug. 29, 2017

(65) Prior Publication Data

US 2018/0057087 A1 Mar. 1, 2018

(30) Foreign Application Priority Data

Aug. 31, 2016 (TW) .............................. 105128092 A (51) Int. Cl.
*B62J 1/08* (2006.01)
*F15B 15/20* (2006.01)

(52) U.S. Cl.
CPC .............. *B62J 1/08* (2013.01); *F15B 15/202* (2013.01); *B62J 2001/085* (2013.01)

(58) Field of Classification Search
CPC ........ B51J 1/06; B51J 1/08; B51J 1/10; A47C 3/30; A47C 3/40
See application file for complete search history.

(56) References Cited

U.S. PATENT DOCUMENTS

| 3,388,883 | A | * | 6/1968 | Felix | A47B 9/10 188/300 |
| 3,787,019 | A | * | 1/1974 | Freitag | A47B 9/10 188/314 |
| 3,861,740 | A | | 1/1975 | Tajima et al. | |
| 4,632,228 | A | * | 12/1986 | Oster | F16F 9/56 188/282.1 |
| 5,097,928 | A | * | 3/1992 | Enders | A47B 9/10 188/282.2 |
| 5,115,723 | A | * | 5/1992 | Wang | A47C 3/30 188/300 |
| 5,137,124 | A | * | 8/1992 | Wirges | A47C 3/30 188/282.1 |

(Continued)

FOREIGN PATENT DOCUMENTS

| CN | 2260757 Y | 8/1997 |
| CN | 204688263 U | 10/2015 |

(Continued)

*Primary Examiner* — Daniel J Wiley
(74) *Attorney, Agent, or Firm* — CKC & Partners Co., Ltd.

(57) ABSTRACT

An adjustable seat tube structure which is for adjusting a height of a saddle for a bicycle includes a lower tube, an upper tube and a piston set. The lower tube includes a top end. The upper tube is disposed at the lower tube and is limitedly moved relative to the lower tube. The upper tube is linked with the saddle and includes an upper end, an inner space, and a lower end. The upper end is protruded out of the top end, and the inner space is for receiving a gas. The lower end is corresponded to the upper end. The piston set includes a piston, a valve and a rod. The piston is disposed inside the inner space, and the lower end is moved relative to the piston. The valve is disposed inside the piston and the rod is connected to the piston.

19 Claims, 8 Drawing Sheets

(56) References Cited

U.S. PATENT DOCUMENTS

| | | | | |
|---|---|---|---|---|
| 5,397,111 A * | 3/1995 | Knopp | A47C 3/30 188/300 |
| 5,725,226 A * | 3/1998 | Cabrerizo-Pariente | B62K 25/08 188/300 |
| 5,887,857 A * | 3/1999 | Perrin | F16F 9/0272 188/322.19 |
| 7,011,191 B2 * | 3/2006 | Spicer | E05F 5/00 188/161 |
| 7,059,592 B2 * | 6/2006 | Huh | A47C 3/30 188/300 |
| 7,152,719 B2 * | 12/2006 | Knaust | B60N 2/231 188/310 |
| 7,231,866 B2 * | 6/2007 | Seong | A47C 3/30 297/344.19 |
| 8,191,964 B2 * | 6/2012 | Hsu | B62K 19/36 280/288.4 |
| 8,398,104 B2 * | 3/2013 | Hsu | B62J 1/08 267/117 |
| 9,073,592 B2 * | 7/2015 | Hsu | B62J 1/08 |
| 2009/0108642 A1 * | 4/2009 | Hsu | B62J 1/08 297/195.1 |
| 2012/0098175 A1 * | 4/2012 | Wu | B62J 1/08 267/132 |
| 2014/0208933 A1 * | 7/2014 | Kuo | B62J 1/08 91/43 |
| 2015/0300382 A1 * | 10/2015 | Kuo | B62J 1/06 91/45 |

FOREIGN PATENT DOCUMENTS

| | | |
|---|---|---|
| DE | 202015104354 U1 | 8/2015 |
| EP | 2284068 A2 | 2/2011 |
| JP | H0550958 A | 3/1993 |
| TW | M444970 U | 1/2013 |
| TW | M525882 U | 7/2016 |

* cited by examiner

ADJUSTABLE SEAT TUBE STRUCTURE AND BICYCLE

RELATED APPLICATIONS

This application claims priority to Taiwan Application Serial Number 105128092, filed Aug. 31, 2016, which is herein incorporated by reference.

BACKGROUND

Technical Field

The present disclosure relates to a seat tube structure and a bicycle. More particularly, the present disclosure relates to a seat tube structure and a bicycle in which a height of a saddle can be adjusted.

Description of Related Art

Bike riding has caused a sensation owing to the raise of the environment protection and the heath conception. Not only can exercising effect be achieved but also the energy can be saved.

A user will adjust the seat height according to his/her body size before riding a bicycle. Conventional seat tube adjusting structure includes a lower tube and a seat tube, and a saddle is disposed on a top end of the seat tube. A distance between a top end of the lower tube and the top end of the seat tube is adjusted by a mechanism, and then the relative position of the seat tube and the lower tube is fixed by a mechanical force. However, under such structure, larger power is required to adjust the distance, and a user need to adjust the mechanism several times to get a suitable seat height, which is very inconvenient.

A structure which includes a gas and an oil is provided. In such structure, a floating piston is required to separate the oil and the gas; accordingly, the cost is high and the structure is complex. Moreover, the piston stroke is limited, and the structure does have its limitation.

Therefore, how to develop an adjustable seat tube structure which has a lower cost and a simplified structure becomes a pursue target for the practitioners.

SUMMARY

An adjustable seat tube structure which is for adjusting a height of a saddle for a bicycle includes a lower tube, an upper tube and a piston set. The lower tube includes a top end. The upper tube is disposed at the lower tube and is limitedly moved relative to the lower tube. The upper tube is linked with the saddle and includes an upper end, an inner space, and a lower end. The upper end is protruded out of the top end, and the lower end is corresponded to the upper end. The inner space is for receiving a gas and an oil. The gas is near the upper end and the oil stays away from the upper end. A surface of the oil touches the gas. The piston set includes a piston, a valve and a rod. The piston is disposed inside the inner space, and the lower end is moved relative to the piston. The valve is disposed inside the piston and the rod is connected to the piston. The valve is opened to allow the gas or the oil to pass through the piston, such that the upper tube is moved relative to the piston set so as to adjust a relative distance between the top end and the upper end, and the relative distance is fixed when the piston is fixed by closing the valve.

An adjustable seat tube structure which is for adjusting a height of a saddle for a bicycle includes a lower tube, an upper tube and a piston set. The lower tube includes a top end. The upper tube is disposed at the lower tube and is limitedly moved relative to the lower tube. The upper tube is linked with the saddle and includes an upper end, an inner space, and a lower end. The upper end is protruded out of the top end, and the inner space is for receiving a gas. The lower end is corresponded to the upper end. The piston set includes a piston, a valve and a rod. The piston is disposed inside the inner space, and the lower end is moved relative to the piston. The valve is disposed inside the piston and the rod is connected to the piston. The valve is opened to allow the gas to pass through the piston, such that the upper tube is moved relative to the piston set so as to adjust a relative distance between the top end and the upper end, and the relative distance is fixed when the piston is fixed by closing the valve.

A bicycle includes a saddle and a frame. The frame is for disposing the saddle and includes an adjustable seat tube structure. The adjustable seat tube structure includes a lower tube, an upper tube, a piston set, and a seat tube. The lower tube includes a top end. The upper tube is disposed at the lower tube and is limitedly moved relative to the lower tube. The upper tube includes an upper end, an inner space, and a lower end. The upper end is protruded out of the top end, and the inner space is for receiving at least one fluid. The lower end is corresponded to the upper end. The piston set includes a piston, a valve and a rod. The piston is disposed inside the inner space, and the lower end is moved relative to the piston. The valve is disposed inside the piston and the rod is connected to the piston. The seat tube is sleeved on the upper tube. The seat tube and the upper tube is limitedly and simultaneously moved relative to the lower tube. The seat tube includes a disposing end near the upper end, and the disposing end is for disposing the saddle. The valve is opened to allow the at least one fluid to pass through the piston, such that the upper tube is moved relative to the piston set so as to adjust a relative distance between the top end and the upper end, and the relative distance is fixed when the piston is fixed by closing the valve.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1A:
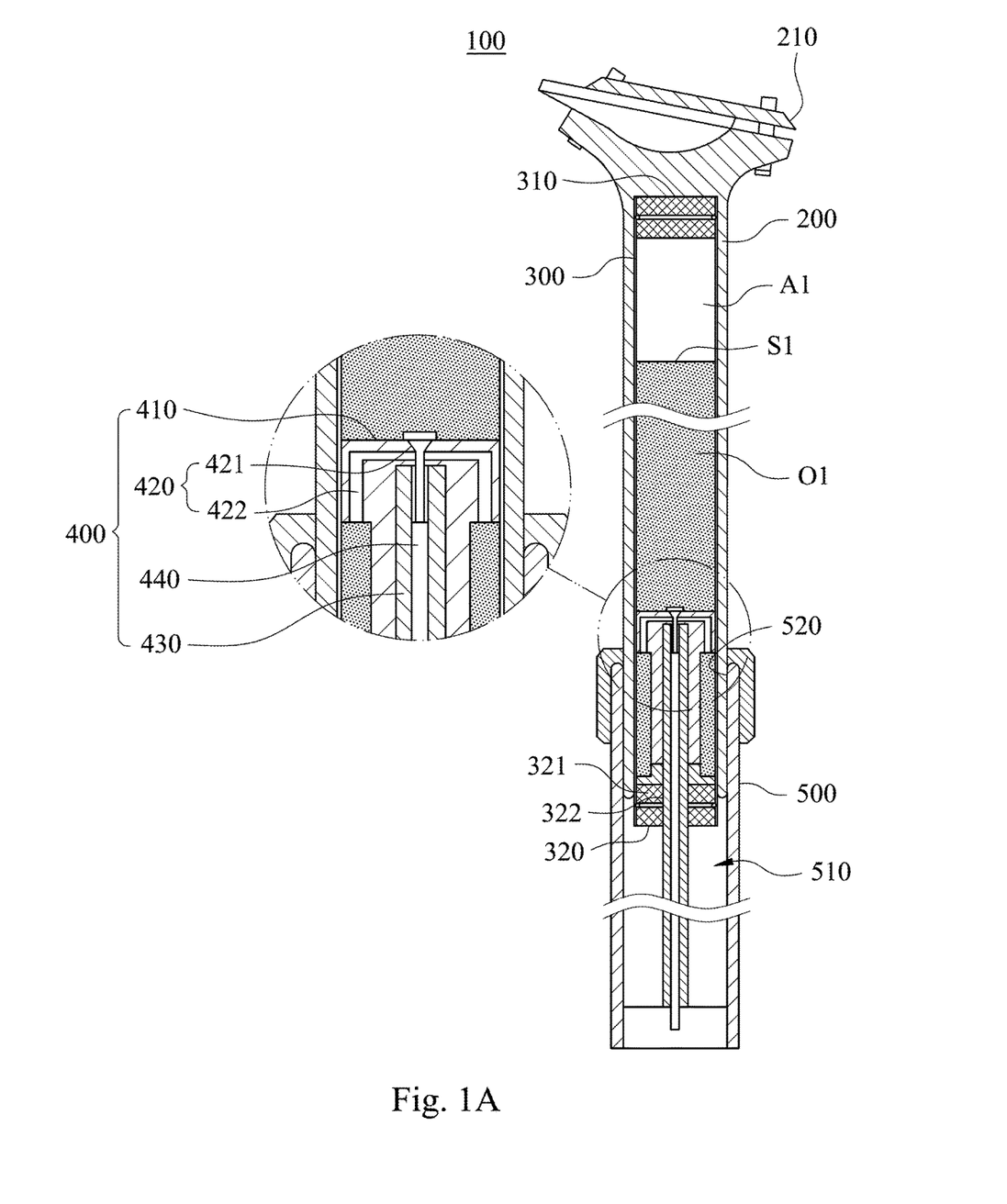
FIG. 1A shows a cross-sectional view of an adjustable seat tube structure according to one embodiment of the present disclosure.
Figure 1B:
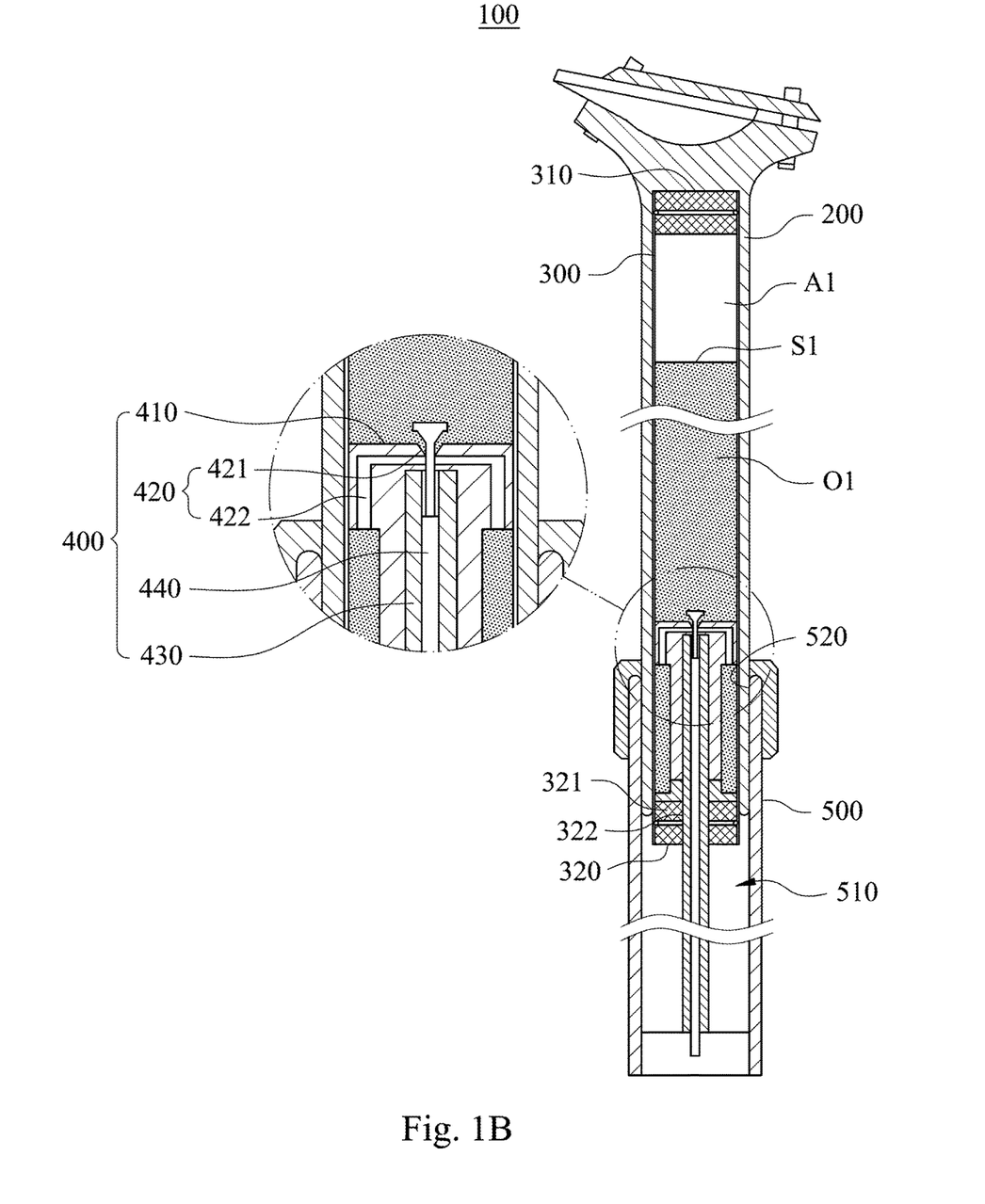
FIG. 1B shows another cross-sectional view of the adjustable seat tube structure of FIG. 1A.
Figure 2A:
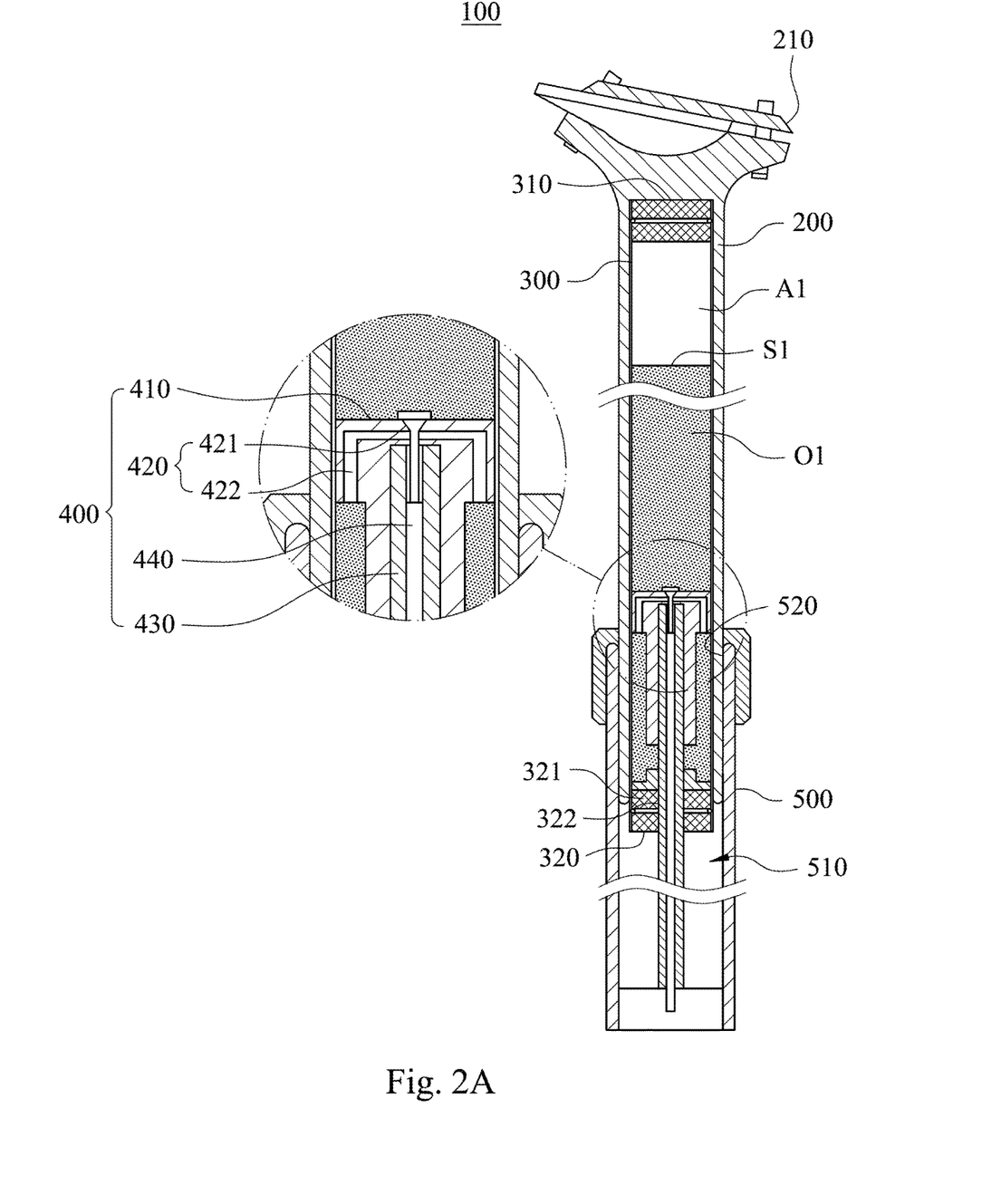
FIG. 2A shows yet another cross-sectional view of the adjustable seat tube structure of FIG. 1A.
Figure 2B:
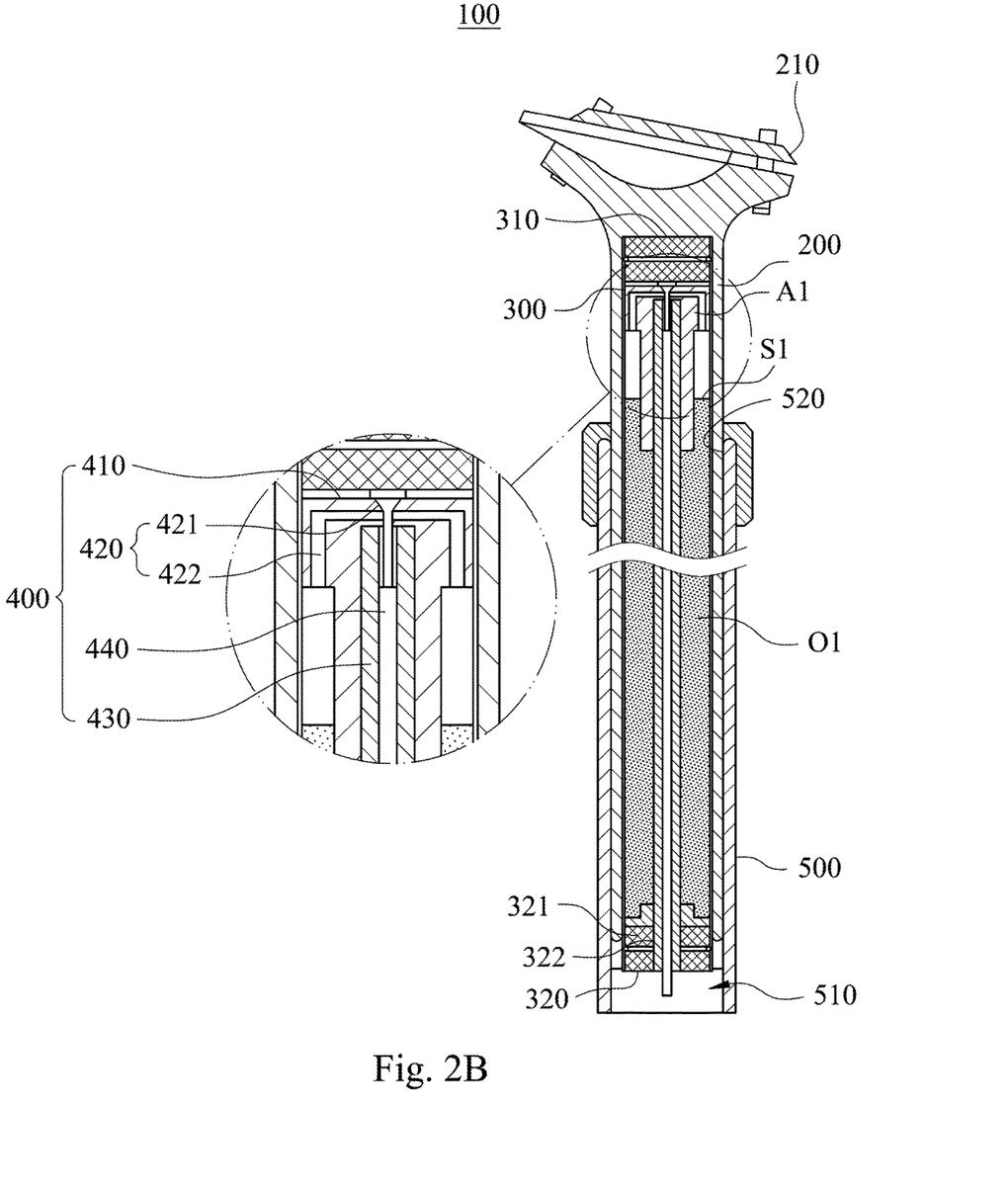
FIG. 2B shows further another cross-sectional view of the adjustable seat tube structure of FIG. 1A.

Please refer to FIG. 1A, FIG. 1B, FIG. 2A and FIG. 2B. FIG. 1A shows a cross-sectional view of an adjustable seat tube structure 100 according to one embodiment of the present disclosure. FIG. 1B shows another cross-sectional view of the adjustable seat tube structure 100 of FIG. 1A. FIG. 2A shows yet another cross-sectional view of the adjustable seat tube structure 100 of FIG. 1A. FIG. 2B shows further another cross-sectional view of the adjustable seat tube structure 100 of FIG. 1A.

Figure 6:
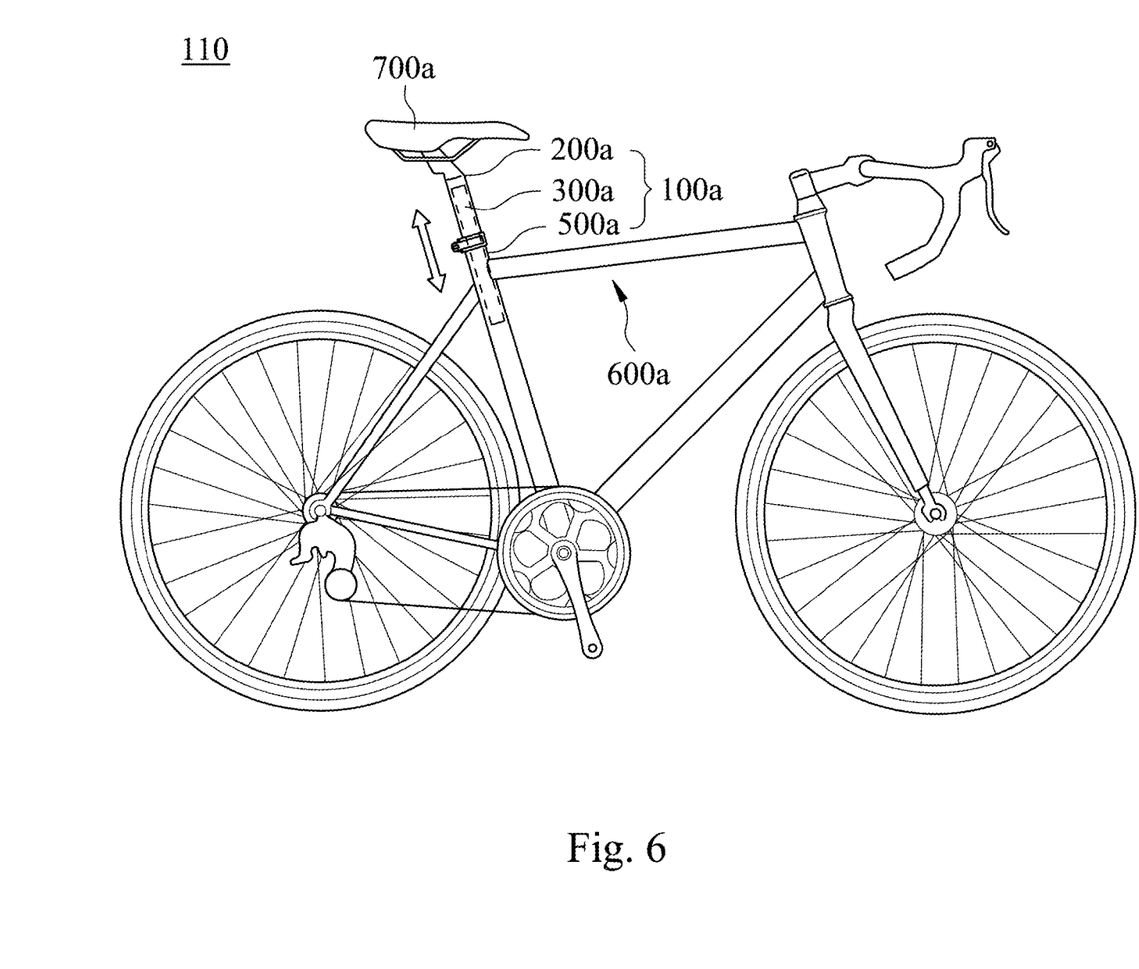
FIG. 6 shows a side view of a bicycle according to further another embodiment of the present disclosure.

The adjustable seat tube structure 100 is for adjusting a height of a saddle 700a (see FIG. 6) for a bicycle 110 (see FIG. 6). The adjustable seat tube structure 100 includes a lower tube 500, an upper tube 300 and a piston set 400. The lower tube 500 includes a top end (not labeled). The upper tube 300 is disposed at the lower tube 500. The upper tube 300 is limitedly moved relative to the lower tube 500 and the saddle 700a is linked with the upper tube 300. The upper tube 300 includes an upper end 310, an inner space (not labeled), and a lower end 320. The upper end 310 is protruded out of the top end, and the inner space is for receiving at least one fluid. In this embodiment, a gas A1 and an oil O1 are received in the inner space. The gas A1 is near the upper end 310. The oil O1 stays away from the upper end 310, and a surface S1 of the oil O1 touches the gas A1. The lower end 320 is corresponded to the upper end 310. The piston set 400 includes a piston 410, a valve 420 and a rod 430. The piston 410 is disposed inside the inner space, and the lower end 320 is moved relative to the piston 410. The valve 420 is disposed inside the piston 410 and the rod 430 is connected to the piston 410. The valve 420 is opened to allow the gas A1 or the oil O1 to pass through the piston 410, such that the upper tube 300 is moved relative to the piston set 400 so as to adjust a relative distance between the top end and the upper end 310, and the relative distance is fixed when the piston 410 is fixed by closing the valve 420.

Therefore, through the configuration of the gas A1, the oil O1 and the piston set 400 inside the upper tube 300, the structure is simplified and the piston 410 can be smoothly moved. Furthermore, the cost is decreased. The details and the operating method of the adjustable seat tube structure 100 will be described in the following paragraphs.

The lower tube 500 is a hollow circular tube body made of a metal material. A receiving space 510 forms therein because of the hollow structure of the lower tube 500. The top end of the lower tube 500 includes an opening 520 which is communicated with the receiving space 510. The material of the upper tube 300 is not limited. The upper tube 300 can be a hollow circular tube with two openings forming at two opposite ends, respectively. The upper end 310 can be closed by an upper seal (not labeled), or the upper end 310 can be, but not be limited, a closed-end which is formed when the upper tube 300 is manufactured.

In the embodiment, the upper tube 300 is disposed inside the receiving space 510 and the upper end 310 is protruded out of the opening 520. The lower end 320 of the upper tube 300 includes a lower seal 321. The lower seal 321 is for covering the lower end 320 to prevent the piston 410 from leaving the upper tube 300, and the lower seal 321 includes a through hole 322 for the rod 430 to pass through. Specially, when the upper tube 300 is moved relative to the lower tube 500, the upper tube 300 keeps air-tight, and the gas A1 and the oil O1 cannot leak.

The piston 410 and the rod 430 are connected to each other. Because the piston 410 is disposed and limited inside the inner space, the piston 410 can only be moved inside the inner space. In the embodiment, an end of the rod 430, which stays away from the piston 410, is fixed at the lower tube 500; consequently, a position of the piston 410 inside the inner space will be changed accordingly when the upper tube 300 is moved, relative to the lower tube 500, inside the receiving space 510.

The adjustable seat tube structure 100 can further include a seat tube 200, the seat tube 200 is sleeved on the upper tube 300. The seat tube 20 and the upper tube 300 are disposed inside the receiving space 510 and are limitedly and simultaneously moved inside the receiving space 510. The seat tube 200 includes a disposing end 210 near the upper end 310, and the disposing end 210 is for disposing the saddle 700a. Hence, when the upper tube 300 is moved relative to the lower tube 500, the seat tube 200 will move simultaneously with upper tube 300, such that the saddle 700a is moved accordingly. When assembling the adjustable seat tube structure 100, the oil O1, the gas A1 and the piston set 400 can be installed into the upper tube 300 first. And then the seat tube 200 is sleeved on an outside of the upper tube 300. Finally, the seat tube 200 and the upper tube 300 are disposed into the receiving space 510. After disposing the saddle 700a onto the disposing end 210, the assembly of the adjustable seat tube structure 100 is completed.

The valve 420 includes a valve opening 421. The piston set 400 further includes a controlling bar 440 for passing through the rod 430 to go into the piston 410 so as to couple to the valve opening 421. The controlling bar 440 is controlled by a controller (not shown) to close the valve opening 421. Precisely, as shown in FIG. 1A, the valve 420 includes a channel 422 and the valve opening 421. The channel 422 passes through the piston 410, and the valve opening 421 is a hole disposed at the piston 410 and is communicated with the channel 422. Consequently, when the valve opening 421 is opened, as shown is FIG. 1B, the oil O1 or the gas A1 which is closed to the upper end 310 can pass through the piston 410 via the valve opening 421 and the channel 422. Or the flowing direction of the oil O1 or the gas A2 can be reversed, which depends on the relative moving direction of the upper tube 300. The adjustable seat tube structure 100 can further include the controller connected to the controlling bar 440. The controller controls the controlling bar 440 to move so as to close or open the valve opening 421.

Because whether the gas A1 and the oil O1 is allowed or avoided to pass thought the piston 410 depends on the open/close status of the valve opening 421. Therefore, the relative height difference between the upper tube 300 and the lower tube 500 can be adjusted, that is, the relative distance between the upper end 310 and the top end can be adjusted thereby. Specifically, if a user wants to adjust the height of the saddle 700a, the user can sit on the saddle 700a first. Then the user can control the controlling bar 440 to open the valve opening 421 via the controller, and the gas A1 or the oil O1 can pass through the piston 410 via the valve 420. Accordingly, when the user press the seat tube 200 by his/her own weight, the seat tube 200 and the upper tube 300 is pressed, which cause the oil O1 or the gas A1 to pass through the piston 410 to change the relative height difference between the upper tube 300 and the lower tube 500. After the height of the saddle 700a is suitable to the user, the user can control the controlling bar 440 to close the valve opening 421 via the controller. And now the gas O1 and the gas A1 cannot pass the piston 410 via the valve 420. The position of the piston 410 is fixed due to the incompressible characteristic of gas A1 and the Oil O1, and the relative height difference between the upper tube 300 and the lower tube 500 is fixed so as to fix the height of the saddle 700a, which is disposed on the seat tube 200.

In the embodiment, the piston 410 is limitedly moved between a top dead center and a bottom dead center. As shown in FIG. 1A, the piston 410 is at a bottom dead center (not labeled), and, as shown in FIG. 2B, the piston 410 is at a top dead center (not labeled). The top dead center is near the upper end 310, and the bottom dead center is near the lower end 320. A fist distance is included between the upper end 310 and the piston 410 when the piston 410 arrives at the bottom dead center, and a second distance is included between the upper end 310 and the piston 410 when the upper end 310 is moved relative to the piston 410 to allow the piston 410 to arrive at the bottom dead center. The first distance is larger than the second distance. When the piston 410 is at the bottom dead center, the length of an exposing part of the seat tube 200 is longest and the exposing part means the part protruding out of the lower tube 500. When the piston 410 is at the top dead center, the length of the exposing part of the seat tube 200 is shortest. Because the controlling bar 440 and the controller for controlling the piston set 400 to move relative to the upper tube 300 are hidden inside the lower tube 500, the bicycle will have simplified and beautiful appearance.

When the upper tube 300 is moved to change the relative position of the piston set 400 in the inner space, the inner space needs an extra volume to receive an inserting part of the rod 430. Because the gas A1 has a little compressibility, the gas A1 can be compressed to produce a space for receiving the inserting part of the rod 430. Hence, the movement of the piston set 400 is smooth.

Figure 3:
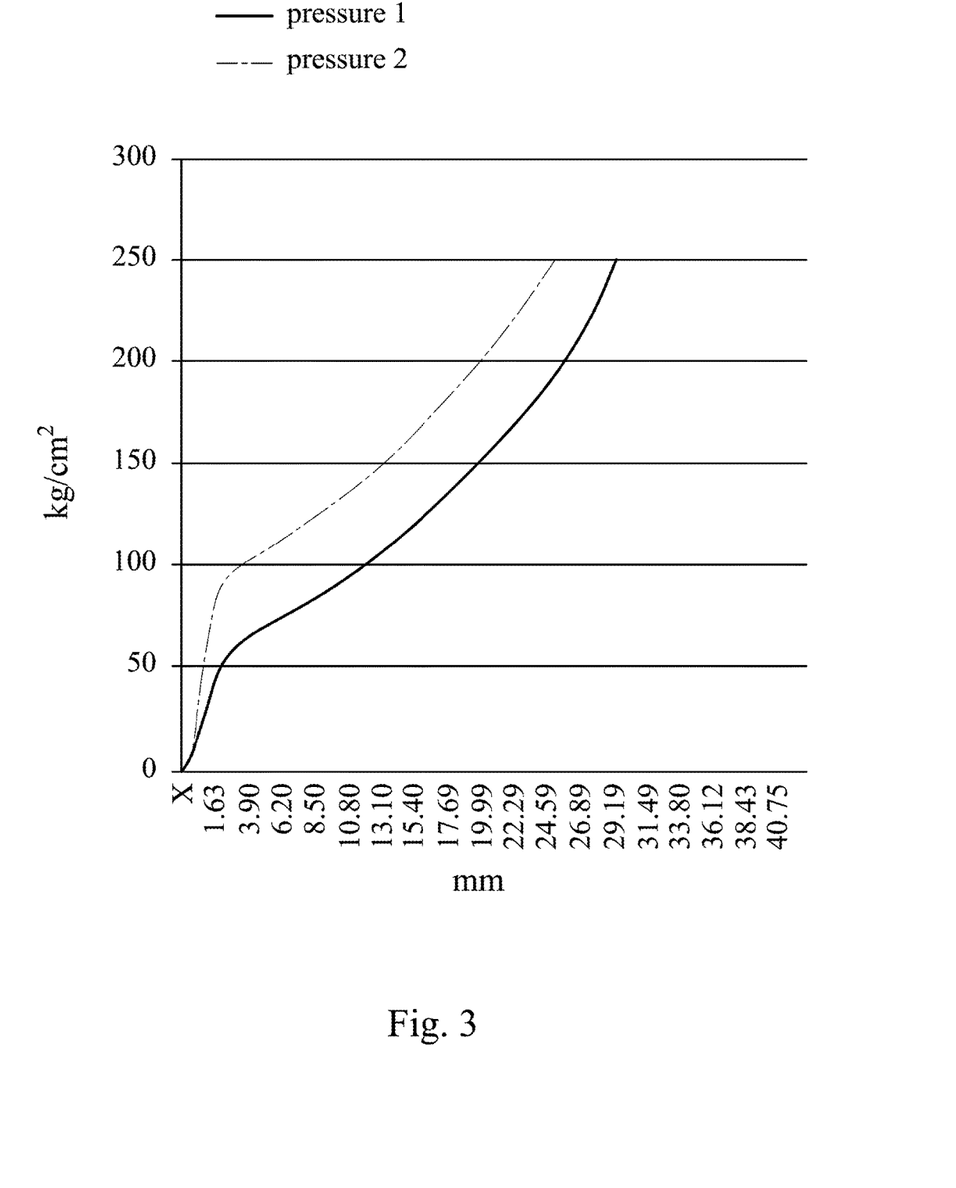
FIG. 3 shows a relationship between gas pressures and valve pressures.

Please refer to FIG. 3. FIG. 3 shows a relationship between gas pressures and valve pressures. As shown in FIG. 3, the pressure 1 is smaller than the pressure 2; therefore, it can be known that the pre-pressure is larger if the pressure of the gas A1 is larger. For the pressure 1, a force of 250 KG can make the piston 410 to move relative to the upper tube 300 29.59 mm when the valve 420 is closed. For pressure 2, a force of 250 KG can make the piston 410 to move relative to the upper tube 300 25.191 mm when the valve 420 is closed. Hence, the pressure of the gas A1 can be adjusted according to the demands.

Figure 4:
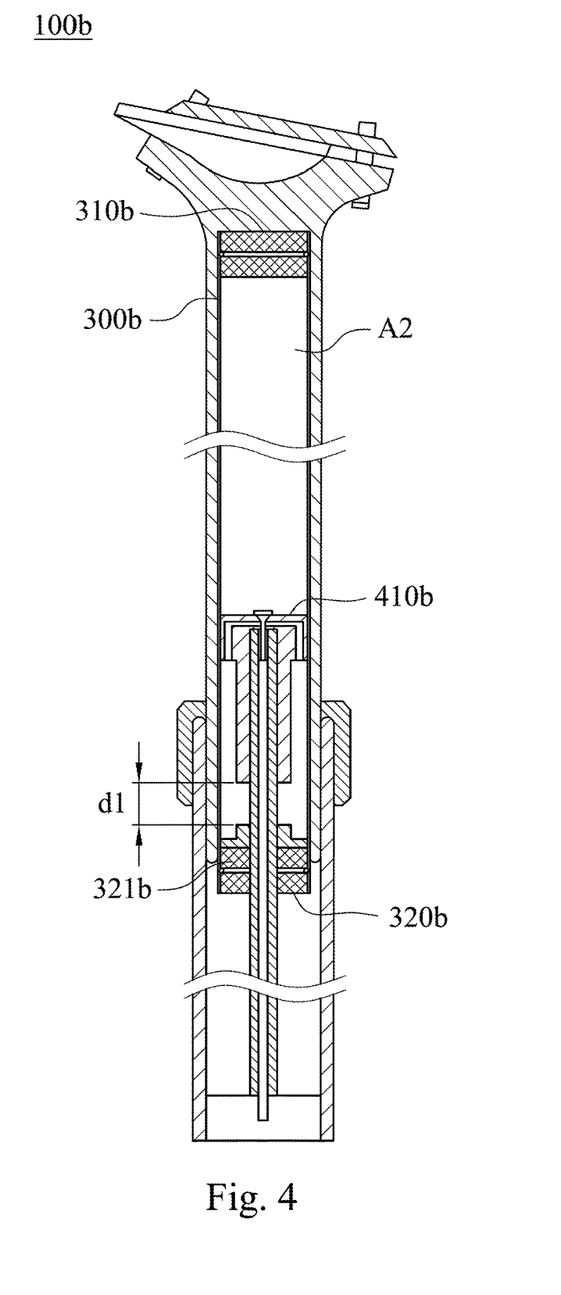
FIG. 4 shows a cross-sectional view of an adjustable seat tube structure according to another embodiment of the present disclosure.

Please refer to FIG. 4. FIG. 4 shows a cross-sectional view of an adjustable seat tube structure 100b according to another embodiment of the present disclosure. The adjustable seat tube structure 100b is similar to the adjustable seat tube structure 100. The adjustable seat tube structure 100b includes an upper tube 300b and a piston 410b. The upper tube 300b includes an upper end 310b, a lower end 320b and a lower seal 321b. The structures and configurations of the upper tube 300b, the piston 410b, the upper end 310b, the lower end 320b and the lower seal 321b are similar to the structures and configurations of the upper tube 300, the piston 410, the upper end 310, the lower end 320 and the lower seal 321 of FIG. 1A, and the details will not be described. In the embodiment, a gas A2 is received inside the inner space. When the piston 410b is at the bottom dead center, a distance d1 is included between the lower seal 321b and the piston 410b. Therefore, when the piston 410b is moved between the top dead center and the bottom dead center, the gas A2 filled in the upper side and the lower sides of the piston 410b can be compressed under a certain force to absorb the force.

Figure 5:
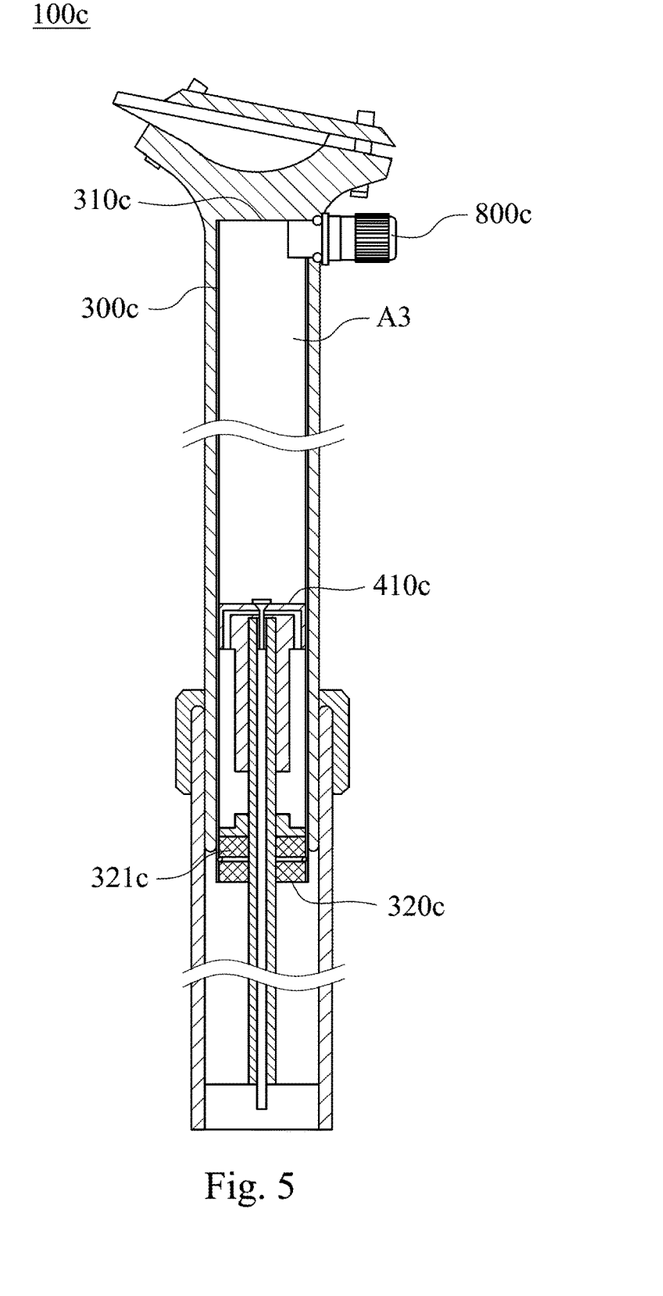
FIG. 5 shows a cross-sectional view of an adjustable seat tube structure according to yet another embodiment of the present disclosure.

Please refer to FIG. 5. FIG. 5 shows a cross-sectional view of an adjustable seat tube structure 100c according to another embodiment of the present disclosure. The adjustable seat tube structure 100c is similar to the adjustable seat tube structure 100. The adjustable seat tube structure 100c includes an upper tube 300c and a piston 410c. The upper tube 300c includes an upper end 310c, a lower end 320c and a lower seal 321c. The structures and configurations of the upper tube 300c, the piston 410c, the upper end 310c, the lower end 320c and the lower seal 321c are similar to the structures and configurations of the upper tube 300, the piston 410, the upper end 310, the lower end 320 and the lower seal 321 of FIG. 1A, and the details will not be described. In the embodiment, a gas A3 is received inside the inner space. When the piston 410c is at the bottom dead center, a distance is included between the lower seal 321c and the piston 410c. In addition, the adjustable seat tube structure 100c can further include a nozzle 800c disposed on the upper end 310c, and the pressure of the gas A3 can be adjusted or added by pumping.

Please refer to FIG. 6. FIG. 6 shows a side view of a bicycle 110 according to further another embodiment of the present disclosure. The bicycle 110 includes a saddle 700a and a frame 600a. The frame 600a is for disposing the saddle 700a and includes an adjustable seat tube structure 100a. The adjustable seat tube structure 100a includes a seat tube 200a, an upper tube 300a and a lower tube 500a. The structures and relationships of the seat tube 200a, the upper tube 300a and the lower tube 500a are similar to the structures and relationships of the seat tube 200, the upper tube 300 and the lower tube 500 of FIG. 1A, and the details will not be described. Therefore, the user can sit on the saddle 700a and press the saddle 700a to press the seat tube 200a into the lower tube 500a so as to allow the piston to move upward relative to the upper end, which can adjust the height of the saddle 700a.

In other embodiment, the adjustable seat tube structure 100a can be replaced by the adjustable seat tube structure 100b or the adjustable seat tube structure 100c to increase the shake absorbing ability.

As the embodiments described above, the adjustable seat tube structure includes the following advantages.

1. The movement of the piston inside the inner space is smoother through the configuration of the oil, the gas and the piston inside the upper tube.

2. Through the configuration of the gas and the oil, the moving ring which is used to separate the gas and the oil can be omitted, and the cost can be decreased.

3. Because the piston can move in the gas and the oil, the piston stroke is longer than the conventional piston stroke on the basis of the same seat-tube length. Accordingly, the adjusting range of the height of the saddle is larger.

4. If only a gas is received in the upper tube, the compressibility of the gas facilitates the smooth movement of the piston. And the force absorbing ability is increased.

5. When at least one fluid is disposed inside the upper tube, the piston stroke is longer. Hence, when the piston stroke of the present invention is as the same as the stroke of the conventional bike, the seat tube of the present invention can be shortened to decrease the cost.

6. If only a gas is received in the upper tube, the adjustable seat tube structure can be lightened.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. An adjustable seat tube structure which is for adjusting a height of a saddle for a bicycle, comprising:
   a lower tube comprising a top end;
   an upper tube disposed within the lower tube and being limitedly moved relative to the lower tube, the upper tube being linked with the saddle, the upper tube comprising:
      an upper end protruded out of the top end;
      an inner space for receiving a gas and an oil, wherein the gas is near the upper end, the oil stays away from the upper end, and a surface of the oil touches the gas; and
      a lower end opposite the upper end; and
   a piston set, comprising:
      a piston disposed inside the inner space, the lower end moved relative to the piston;
      a valve disposed inside the piston; and
      a rod connected to the piston;
   wherein the valve is opened to allow the gas or the oil to pass through the piston, such that the upper tube is moved relative to the piston set so as to adjust a relative distance between the top end and the upper end, and the relative distance is fixed when the piston is fixed by closing the valve.

2. The adjustable seat tube structure of claim 1, wherein the valve comprises a valve opening, and the piston set further comprises:
   a controlling bar for passing through the rod to go into the piston so as to couple to the valve opening, the controlling bar being controlled by a controller to close the valve opening.

3. The adjustable seat tube structure of claim 1, wherein the upper tube comprises a lower seal, the lower seal is for covering the lower end to prevent the piston from leaving the upper tube, and the lower seal comprises a through hole for the rod to pass through.

4. The adjustable seat tube structure of claim 1, further comprising:
   a seat tube sleeved on the upper tube, the seat tube and the upper tube disposed inside a receiving space of the lower tube, the seat tube and the upper tube being limitedly and simultaneously moved inside the receiving space, the seat tube comprising a disposing end near the upper end, wherein the disposing end is for disposing the saddle.

5. The adjustable seat tube structure of claim 1, wherein the piston is limitedly moved between a top dead center and a bottom dead center, a first distance is included between the upper end and the piston when the piston arrives at the bottom dead center, a second distance is included between the upper end and the piston when the upper end is moved relative to the piston to allow the piston to arrive at the bottom dead center, the first distance is larger than the second distance, and when the piston is moving from the bottom dead center to the top dead center, the relative distance is incrementally shortened.

6. The adjustable seat tube structure of claim 1, wherein the piston is limitedly moved between a top dead center and a bottom dead center, the top dead center is near the upper end, and the bottom dead center is near the lower end.

7. The adjustable seat tube structure of claim 6, wherein the piston touches the gas when the piston arrives at the top dead center.

8. The adjustable seat tube structure of claim 1, further comprising:
   a nozzle disposed at the upper end.

9. An adjustable seat tube structure which is for adjusting a height of a saddle for a bicycle, comprising:
   a lower tube comprising a top end;
   an upper tube disposed within the lower tube and being limitedly moved relative to the lower tube, the upper tube being linked with the saddle and comprising:
      an upper end protruded out of the top end;
      an inner space for receiving a gas; and
      a lower end opposite the upper end; and
   a piston set, comprising:
      a piston disposed inside the inner space, the lower end moved relative to the piston;
      a valve disposed inside the piston; and
      a rod connected to the piston;
   wherein the valve is opened to allow the gas to pass through the piston, such that the upper tube is moved relative to the piston set so as to adjust a relative distance between the top end and the upper end, and the relative distance is fixed when the piston is fixed by closing the valve.

10. The adjustable seat tube structure of claim 9, wherein the upper tube comprises a lower seal, the lower seal is for covering the lower end to prevent the piston from leaving the upper tube, and the lower seal comprises a through hole for the rod to pass through.

11. The adjustable seat tube structure of claim 10, wherein the piston is limitedly moved between a top dead center and a bottom dead center, the top dead center is near the upper end, the bottom dead center is near the lower end, and a height is included between the piston and the lower seal when the piston arrives at the bottom dead center.

12. The adjustable seat tube structure of claim 9, wherein the piston is limitedly moved between a top dead center and a bottom dead center, a first distance is included between the upper end and the piston when the piston arrives at the bottom dead center, a second distance is included between the upper end and the piston when the upper end is moved relative to the piston to allow the piston to arrive at the bottom dead center, the first distance is larger than the second distance, and when the piston is moving from the bottom dead center to the top dead center, the relative distance is incrementally shortened.

13. The adjustable seat tube structure of claim 9, further comprising:
   a nozzle disposed at the upper end.

14. A bicycle, comprising:
   a saddle; and
   a frame for disposing the saddle, comprising:
      an adjustable seat tube structure, comprising:
         a lower tube comprising a top end;
         an upper tube disposed within the lower tube and being limitedly moved relative to the lower tube, comprising:
            an upper end protruded out of the top end;
            an inner space for receiving at least one fluid; and
            a lower end opposite the upper end;
         a piston set, comprising:
            a piston disposed inside the inner space, the lower end moved relative to the piston;
            a valve disposed inside the piston; and
            a rod connected to the piston; and a seat tube sleeved on the upper tube, the seat tube and the upper tube being limitedly and simultaneously moved relative to the lower tube, the seat tube comprising a disposing end near the upper end, wherein the disposing end is for disposing the saddle;

wherein the valve is opened to allow the at least one fluid to pass through the piston, such that the upper tube is moved relative to the piston set so as to adjust a relative distance between the top end and the upper end, and the relative distance is fixed when the piston is fixed by closing the valve.

15. The bicycle of claim 14, wherein the valve of the adjustable seat tube structure comprises a valve opening, and the piston set further comprises:

the controlling bar for passing through the rod to go into the piston so as to couple to the valve opening, the controlling bar being controlled by a controller to close the valve opening.

16. The bicycle of claim 15, wherein the adjustable seat tube structure further comprises:

the controller connected to the controlling bar so as to axially move the controlling to close the valve opening.

17. The bicycle of claim 14, wherein the upper tube of the adjustable seat tube structure comprises a lower seal, the lower seal is for covering the lower end to prevent the piston from leaving the upper tube, and the lower seal comprises a through hole for the rod to pass through.

18. The bicycle of claim 14, wherein the seat tube is pressed into the lower tube so as to allow the piston to approach the upper end when the saddle is pressed.

19. The bicycle of claim 14, wherein the adjustable seat tube structure further comprising a nozzle disposed at the upper end.

* * * * *